United States Patent [19]

Boudreaux

[11] Patent Number: 4,551,068
[45] Date of Patent: Nov. 5, 1985

[54] DUPLEX PUMP CONTROLLER

[76] Inventor: Ronald J. Boudreaux, P.O. Box 722, Station 2, Houma, La. 70360

[21] Appl. No.: 517,186

[22] Filed: Jul. 25, 1983

Related U.S. Application Data

[63] Continuation-in-part of Ser. No. 316,503, Oct. 29, 1981, abandoned.

[51] Int. Cl.$^4$ .................... G08B 19/00; E03F 7/00; F04B 49/10; F04B 49/06
[52] U.S. Cl. .................................. 417/8; 417/36; 417/63; 137/392; 307/311
[58] Field of Search ............... 417/7, 8, 36; 137/392; 307/311

[56] References Cited

U.S. PATENT DOCUMENTS

| | | | |
|---|---|---|---|
| 3,285,181 | 11/1966 | Howard | 417/8 |
| 4,065,227 | 12/1977 | Rose | 307/311 |
| 4,087,706 | 5/1978 | Koester | 307/311 |
| 4,222,711 | 9/1980 | Mayer | 417/7 |
| 4,380,091 | 4/1983 | Lively | 137/392 |
| 4,444,545 | 4/1984 | Sanders et al. | 417/36 |

Primary Examiner—John S. Heyman
Attorney, Agent, or Firm—George A. Bode

[57] ABSTRACT

A 100% solid state, liquid level control circuit which utilizes printed board construction with integrated circuits to control duplex pumps. Mercury switches provide information to the solid state, non-inductive input interface circuitry which relays this information to logic control circuitry and an alternator. The logic control circuitry and an alternator forward the information to solid state, non-inductive output circuitry for powering pump starters. The alternator selectively alternates the sequencing of the pumps for controlling the lead pump. Current limiting devices, light emitting diodes and logic control circuitry are combined to provide operation of pump starters for controlling the liquid level in a wet well, reservoir, bilge of a vessel, or the like.

16 Claims, 3 Drawing Figures

DUPLEX PUMP CONTROLLER

This application is a continuation-in-part of co-pending application Ser. No. 316,503, filed Oct. 29, 1981 now abandoned.

BACKGROUND OF THE INVENTION

1. Field of the Invention

This invention relates to the control of the liquid level in a sump, wet well, reservoir, drainage canal, bilge of a vessel, or the like. In particular, this invention relates to a solid state electronic control system to control duplex motor starters designed to power pumps.

2. General Background

In the past, duplex pump controllers have been utilized for various types of circuits, gauges, and switches to form a liquid level controller. Each of the means used has its own disadvantages.

Conventional relay systems, the most common type of duplex pump control that is in use, present two main disadvantages. First, if the system utilizes line voltage on mercury floats which is in a wet well, the system will not be safe. If low voltage is used, the system will be safe if the proper relays in a low system voltage is used. The disadvantages are that low voltage transformers, isolation relays for each float switch, and a current limiting device to maintain safe currents and voltages are required. This equipment takes up extra space, uses extra power, and creates extra heat.

Hybrid circuits, combinations of solid state and conventional relay circuits, have been used but are prone to failure due to the combination and often require float isolation relays to maintain safe float switch voltages and currents. These circuits also increase dissipation of power and require extra space.

Some duplex pump controllers have utilized complex solid state circuitry wherein a pressure sensitive strain gauge is coupled to solid state logic circuitry. The resulting system is safe but has disadvantages in that it is very complex, requires an air compressor to operate the strain gauge and numerous other components, is very costly, and requires trained technicians to make repairs due to its complexity.

Many systems use a pressure switch gauge connected to a conventional relay system. Although they are commonly used and safe, there are disadvantages. An air compressor, switch gauge, and relay logic are required and because of its mechanical nature, the system is prone to failure. This system is also costly in initial investment and maintenance after approximately two years in operation.

The oldest method, using a float ball and rod, is safe and reliable but does not afford the needed true control of the pumping sequence in a duplex pump system.

GENERAL DISCUSSION OF THE PRESENT INVENTION

The preferred embodiment of the present invention solves the problems encountered in the present state of the art in a simple and inexpensive manner. The present invention provides for 100% solid state circuitry with no moving parts, no mechanical parts, no conventional relays, low power dissipation, and safety due to controlled voltage and current.

The preferred embodiment of the present invention utilizes printed circuit (P-C) board and construction having four integrated circuits to monitor four mercury float switches which detect the liquid level in a well, reservoir, canal, vessel, or the like. The present invention, designed to be mounted within an enclosure containing two conventional combination motor starters and control circuit breakers, has the output of four mercury switches connected to an input interface circuit. The input interface circuit relays the signals from the mercury switches to logic circuitry which serves as the controller and alternator for the pumping sequence. The control circuit, in turn, sends signals to solid state output devices which activate and deactivate pumps and an alarm.

Therefore, it is an object of the present invention to provide a duplex pump controller that is simple and reliable in its operation.

It is a further object of the present invention to provide a duplex pump controller that is not sensitive to float switch bounce.

It is another object of the present invention to provide a duplex pump controller that is safe in operation.

To accomplish the above objects, it is a feature of the present invention to provide 100% solid state circuitry with no mechanical or moving parts.

It is another feature of the present invention to provide a system utilizing low voltage and amperage.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and, wherein.

DETAILED DESCRIPTION OF THE PREFERRED EMBODIMENT

Figure 1:
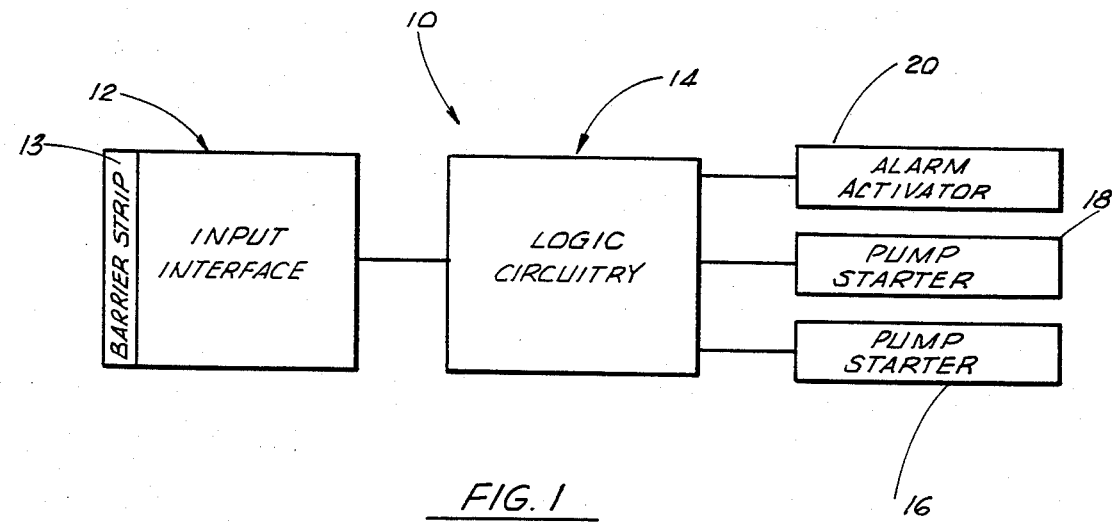
FIG. 1 is a block diagram of the invention.
Figure 3:
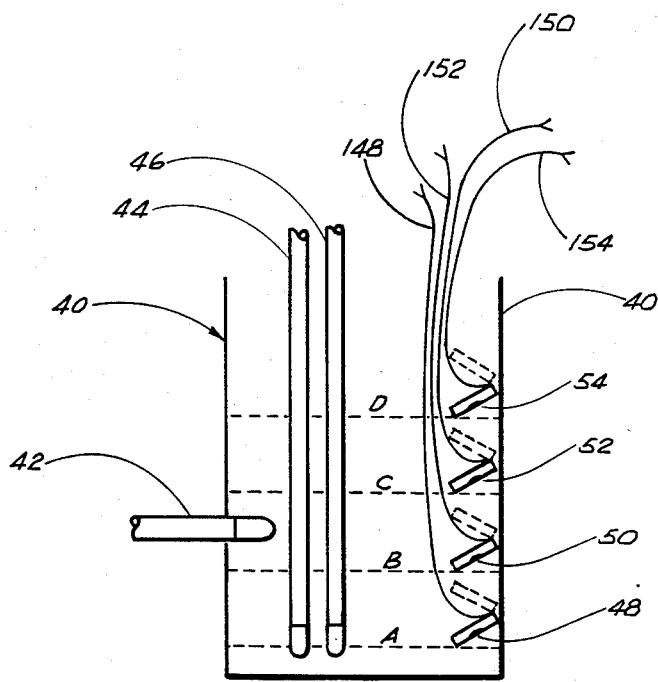
FIG. 3 illustrates a typical installation of mercury float switches in a wet well or sewerage system.

As can be seen in the block diagram of FIG. 1, the apparatus is generally referred to by the numeral 10 and separated into three major areas. First, there is input interface 12. Connected to input interface 12 is barrier strip 13 or terminal block 13 such as a TRW 9-141 barrier strip with MS 9-141 index. Barrier strip 13, to be more fully described later, serves to receive the input of mercury float switches 48, 50, 52, 54 (as seen in FIG. 3). Barrier strip 13 conveys the input information from mercury switches 48, 50, 52, 54 to input interface 12 which then sends the information to logic control/alternator circuitry 14. Circuitry 14 is preferably TTL (Transistor Transistor Logic), a standard industry abbreviation and of the series 54 family of logic, which is a standard military specification logic circuitry. Control/alternator circuit 14 then sends signals to output devices 16, 18, 20 (solid state, non-inductive, 120 or 240 volts AC at 2 ampere maximum continuous current) where output device 16 would be a starter for pump No. 1 (not shown); output device 18 would be a starter for pump No. 2 (not shown); and output device 20 would be an activator for an external alarm (not shown) which could emit audible or visual signals or both when activated. Pump starters of size 00 and larger may be used with the circuitry of the invention. The pump starters as referred to are magnetic starters with size reference numbers which are standards for pump starters as determined by the National Electrical Manufacturers Association (NEMA).

Figure 2:
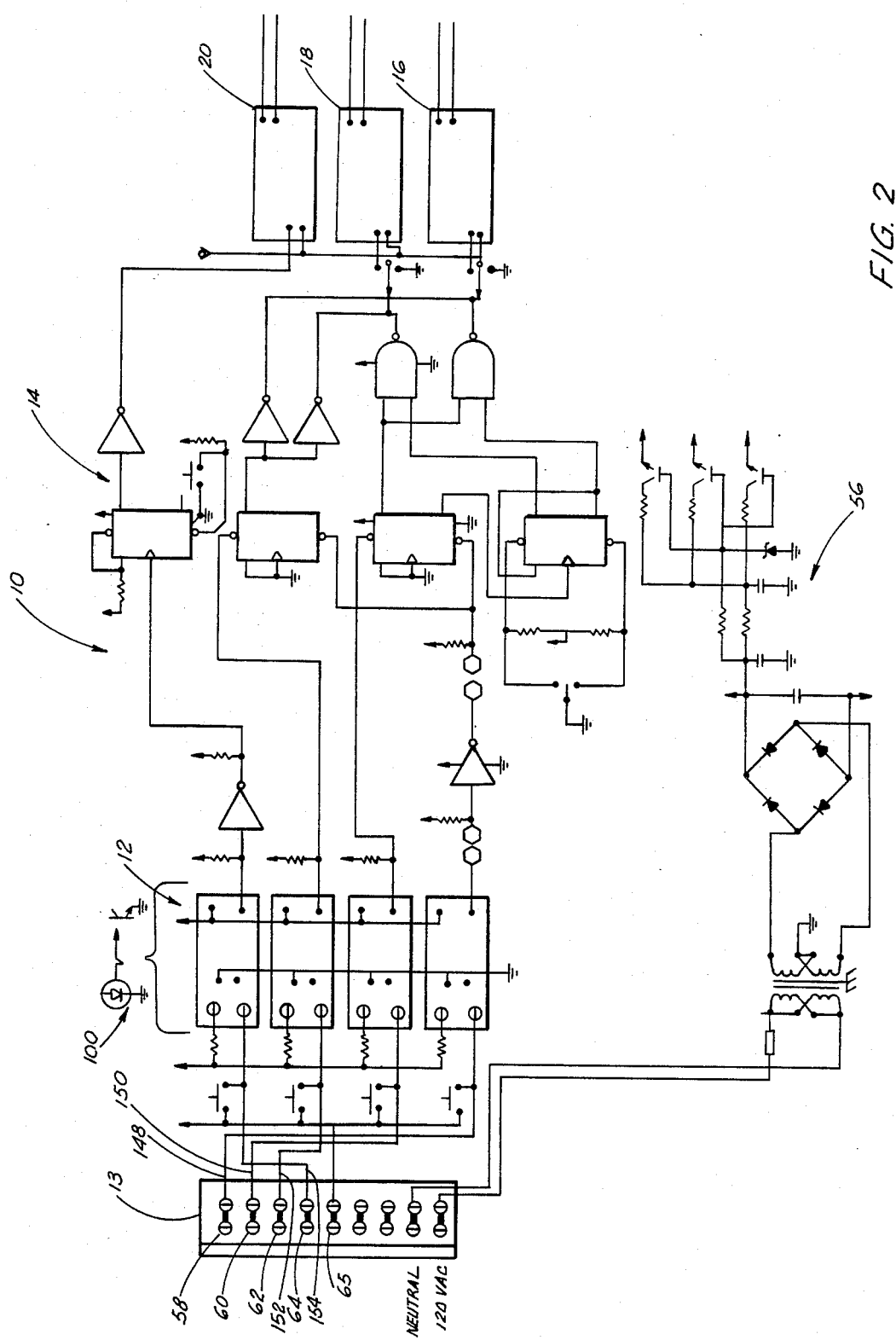
FIG. 2 is a detailed drawing of the schematic printed wire board and typical wiring diagram.

In the schematic of FIG. 2, the power supply, generally referred to by the numeral 56, is seen to be a full wave rectified bridge. Transformer T1 is a 120/240 volt primary to 6/12 volt secondary transformer. Transformer T1 supplies power to the full wave bridge rectifiers D1, D2, D3, D4. Capacitor C1 filters the output of the bridge rectifiers to provide nominal 17 volts DC to the float input circuitry. Capacitor C2, C3 and resistor R19 form a phi filter network to increase filter efficiency. Resistor R18 and zenor diode D5 derive the DC reference voltage to regulate the power supply pass transistors Q1, Q2 and Q3. Resistors R15, R16 and R17 are voltage dropping resistors used to reduce power dissipation in the pass transistors. The power supplied to the float switches is approximately 17–20 volts DC nominal with a maximum input current of 15 milliamperes DC. It can be seen that the float switches receive the combined voltage of V1 and V2 as seen at the output of the rectifier bridge circuit or power supply 56 by the connection provided by the float switch common output on terminal block 13 to V1 and the connection to V2 through resistors R11-R14.

Turning now to input interface 12, which is comprised of solid state non-inductive circuitry, it can be seen that barrier strip 13 has connections for float switches 48, 50, 52, 54 (seen in FIG. 3) and power supply 56. The input from float switches 48–54, to be described at a later point, is directed through film resistors R11, R12, R13, R14 respectively to input modules 5, 6, 7, 8 upon closing of float switches 48–54 in response to varying fluid levels. Closing of one or all of float switches 48–54 by a high water condition causes completion of the respective circuits to resistors R11-R14 by V1 at block 13 and the series connection of resistors R11-R14 to V2 through float switches 48–54. All float switch inputs are 100% solid state, non-inductive. Film resistors R11-R14 are 100 ohm resistors such as Corning RN 55 Series which necessarily limit the current input of the apparatus for safe operation. Input modules 5, 6, 7, 8 are optically coupled interface units with open collector outputs and are preferably Crydom Part No. S410 input/output interface switches which are manufactured by International Rectifier. The optically coupled interface units are comprised of phototransistors which utilize light emitting diodes (LEDs), as illustrated by a standard optically coupled phototransistor 100 illustration in FIG. 2 to relay the input from barrier strip 13 so that there is no build-up of an electrical charge with the resulting possibility of a dangerous spark as is the case where coils and mechanical relays are used. Input modules 5, 6, 7, 8 then forward the signals into logic controller/alternator circuitry 14 and then to solid state outputs 16, 18, 20. Because the sensor inputs are resistive, failure of an input interface unit in a shorted mode results in a maximum short circuit current flow through the sensor input being limited to a maximum of 180 milliamperes DC which is well below the minimum igniting currents as determined in NFPA 493, paragraph 5-3.3 and corresponding figures 5.1-3(a) and 5.1-3(b). A shorted input interface unit or other short affecting resistors R11-R14 will cause the affected resistor to overheat and melt, thus breaking any electrical current and preventing a possible spark and ignition of the surrounding atmosphere within the well, vessel or reservoir which contains the mercury float switches.

As seen in FIG. 2, switches S6, S7 and S8 may be utilized to selectively control the mode of operation of pumps 1 and 2. The switches may be used to manually turn on the pumps without the need for activation by float switches 48-54, may be used to turn off the pumps, may be used to place the pumps under the automatic control of apparatus 10 for automatic alternation of the lead pump, or may be used to select which pump will be the lead pump. Switch S5 is used to reset the high level alarm after it has been activated by a high level liquid condition. Switches S1, S2, S3, S4 which are positioned between optical interface units 5-8 and barrier strip 13 may be used to test the circuit operation of apparatus 10 by simulating activation of float switches 48, 50, 52 and 54.

FIG. 3 illustrates a typical installation of float switches 48–54 in a wet well or sewerage environment where flammable gases may exist. It is readily seen that float switches 48–54 are positioned at four levels so that varying liquid levels, A, B, C, D progressively activate and deactivate float switches 48–54.

In operation, float switch 48 would be the stop float switch and connected to input 58 (as seen in FIG. 2) on barrier strip 13 by wire connection 148 illustrated in FIG. 3. Switch 50 corresponds to the lead float switch and would be connected to input 60 on barrier strip 13 by wire 150. Switch 52 corresponds to the lag float switch and would be connected to input 62 on barrier strip 13 by wire 152. Switch 54 corresponds to the high level alarm switch and would be connected to input 64 on barrier strip 13 by wire 154. Each of switches 48–54 would have one of its wire leads connected to common float switch terminal 65 on barrier strip 13 with the remaining lead wire being connected to the respective terminals as mentioned to complete the connection of float switches 48–54 to V1 and for supplying input into apparatus 10.

When the liquid level rises above point A due to inflow of liquid from source 42, switch 48 is closed or activated by movement into the position seen in phantom view in FIG. 3. As can be seen by the circuitry of FIG. 2, this completes the circuit through switch 48 into input module 8 and combines the voltage of V1 and V2 through barrier strip 13 and film resistor R14. This enables the circuitry to activate the lead and lag pumps, which are connected to suction lines 44, 46 as the liquid level rises past points B and C and activates switches 50, 52 respectively. The lead pump is activated when the liquid level rises above point B by closing of switch 50 and the lag pump is activated when the liquid level rises above point C and closes switch 52. If the inflow of liquid from source 42 is greater than the outflow created by both pumps, the level of liquid will rise above point D, activating switch 54 and in turn activating the latched high level alarm. When the liquid level drops below point D, deactivating switch 54, the high level alarm will not automatically be shut off. The high level alarm must be manually shut off by using switch S5 as described above. When the liquid level falls below point C and B, switch 52 and 50, respectively, are deactivated but the lag and lead pumps are not turned off until the liquid level falls to point A, deactivating stop float switch 48. The turning off of the pumps by stop float switch 48 causes the controller/alternator circuitry to toggle and alternate the lead pump when the alternator switch S8 is in the middle alternate position. The alternation of the lead pump by automatic turning off of the lead pump and not by the stop float switch is responsible for making the system resistant to float switch bounce and providing reliable alternation of the lead pump. Alternation of the lead pump helps to prevent either pump from losing its prime. Loss of prime by a pump can contribute to a high level condition since extra time is required for a pump with a loss of prime to regain its prime and pump out liquid efficiently once it is activated. The activation or closing of the respective switches as the fluid level rises causes completion of the respective circuits through the film resistors and activation of the optically coupled interface units utilizing the LED/phototransistor to activate the logic circuit and cause activation of the proper pump or alarm. The preferred embodiment of the invention utilizes a printed circuit board for reliability in providing connections and ease of assembly.

The preferred embodiment of the present invention utilizes components capable of operating in an ambient temperature range of 0° C. to 60° C. All of the integrated circuits utilize ceramic packaging and have an ambient temperature operating range of −25° C. to +125° C. All of the solid state input and output modules have an ambient temperature range of 0° C. to 70° C.

A parts list is provided below which provides the preferred components used in relation to the corresponding identified circuits or portions thereof in the circuitry of FIG. 2.

1, 2—SN 5474J Integrated Circuit
3—SN 5406J Integrated Circuit
4—SN 5403J Integrated Circuit
5-8—Crydom S410 Interface Module
9-11—Crydom S228 Solid State Relay
R1-R10—1000 OHM, ⅛ Watt, 5% Carbon Resistor
R11-R14—100 OHM, ⅛ Watt, 2% Film Resistor
R15-R17—10 OHM, ¼ Watt, 5% Carbon Resistor
R18—100 OHM, ⅛ Watt, 5% Carbon Resistor
R19—3 OHM, ½ Watt, 5% Carbon Resistor
S1-S5—ALCO TPC13 Miniature Momentary Push Button Switch
S6-S8—ALCO MTA1U6E Miniature On-Off-On Toggle Switch
Q1-Q3—2N2222 Transistor
D1-D4—1N4001 Diode
D5—1N752 Zener Diode
C1-C2—Sprague 503D Series Electrolytic Capacitor—100 MF, 35 VDC
C3—Sprague 503D Series Electrolytic Capacitor—330 MF, 50 VDC
T1—Traid F-105Z Control Transformer 115/230 VAC Primary, 6 VAC at 2A. or 12 VAC at 1A. Secondary
Barrier Strip 13—TRW9-141 Barrier Strip with MS9-141 Index Alternate embodiments of the present invention can be provided as follows:

Inputs to flip-flop 1B and 2A could be leading edge triggered the same as flip-flop 1A. This would be accomplished by modifying the circuit as follows:

a. Connect pins 10 and 12 of flip-flop 1B and pins 2 and 4 of flip-flop 2A to a 1000 OHM pull up resistor to V5.;

b. Connect the output of input module 7 to the input of an inverter and connect the inverter output to pin 3 of flip-flop 2A;

c. Connect the output of input module 6 to the input of an inverter and connect the inverter output to pin 11 of flip-flop 1B. This will edge trigger flip-flops 1B and 2A when the corresponding float switches are turned on.

Input signals to lead float switch 50, lag float switch 52 and high level float switch 54 can be 12 VAC with the current design.

Utilization of AC inputs to lead switch 50, lag switch 52, and high level switch 54 with edge trigger inputs to flip-flops 1B and 2B may be accomplished as follows:

a. Input to flip-flops 1B and 2A can be edge triggered with 12 VAC inputs to the float switch. Pins 10 and 12 of flip-flops 1B would be connected with pins 2 and 4 of flip-flop 2A to a 1000 OHM pull up resistor to V5;

b. Inverter 3B and resistor R4 would be removed;

c. The output of module 5 would be connected to the trigger input pin 3 of flip-flop 1A;

d. The output of module 6 would be connected to the trigger input pin 11 of flip-flop 1B;

e. The output of module 7 would be connected to the trigger input pin 3 of flip-flop 2A.

Input signals to the stop float switch 48 can be 12 VAC by removing inverter 3A from the circuitry by connecting jumper points A to D and using a normally closed stop float switch 48. When the stop float switch 48 turns off (liquid level rises) the output of module 8 would turn off, thereby allowing pull up resistor R8 to pull up the voltage at pin 13 of flip-flop 1B and pin 1 of flip-flop 2A thereby removing the flip-flop clear. When the float switch turns on (liquid level drops), the normally closed stop switch is in the normal position, thereby applying 12 VAC to the input of module 8. The output of module 8 then produces a 60 HZ square wave then applied to the clear inputs of flip-flop 1B pin 13 and flip-flop 2A pin 13 clears both flip-flops which turns off both pump starters.

Because many varying and different embodiments may be made within the scope of the inventive concept herein and because many variations of the embodiments described may be made, the description herein should be read as illustrative and not in a limiting sense.

What is claimed as invention is:

1. A duplex pump controller adapted for use in wet wells having a flammable gas environment, comprising:
   a. means responsive to varying fluid levels within said well for providing signals in response thereto;
   b. a terminal block connected to said means for providing a barrier between said response means and said controller;
   c. a plurality of optically coupled interface units connected to said terminal block for providing spark free intercoupling to said controller;
   d. precise current limiting means connected in series to each of said interface units for providing safe current levels thereto;
   e. a power source connected to said current limiting means for providing power to said controller and said current limiting means; and
   f. solid state relay latching means and logic control circuitry connected to said interface units for activating said pump controller.

2. The apparatus of claim 1 wherein said means responsive to varying fluid levels comprises float switches.

3. The apparatus of claim 1, further comprising solid state non-inductive output circuitry connected to said control circuitry.

4. The apparatus of claim 3 wherein said output circuitry is used to control pump starters.

5. The apparatus of claim 1 wherein said power source provides approximately 17 volts DC.

6. The apparatus of claim 1 wherein said logic control circuitry further comprises an alternator.

7. A duplex pump controller for at least two pumps adapted for use in wet wells having a flammable gas environment, comprising;
   a. a plurality of float switches responsive to varying fluid levels within said well for providing signals in response thereto;
   b. a terminal block having a plurality of inputs connected to said switches providing a barrier between said float switches and said controller;
   c. a plurality of optically coupled interface units connected to said terminal block for providing spark free intercoupling to said controller;
   d. precise current limiting means connected in series to each of said interface units for providing safe current levels thereto;
   e. a power source connected to said said current limiting means for providing power to said controller and said current limiting means; and
   f. solid state relay latching means and logic control/alternator circuitry connected to said interface units for activating said pump controller.

8. The apparatus of claim 7 wherein said current limiting means comprises at least one 100 OHM film resistor.

9. The apparatus of claim 7, further comprising solid state non-inductive output circuitry connected to said control/alternator circuitry for controlling pump starters.

10. The apparatus of claim 7 wherein said logic control circuitry is comprised of Series 54TTL circuitry.

11. The apparatus of claim 9 wherein said output circuitry further comprises circuitry for activating a latched alarm system.

12. A duplex pump controller for at least two pumps adapted for use in wet wells having a flammable gas environment, comprising;
   a. a plurality of switches responsive to varying fluid levels within said well for providing signals in response thereto;
   b. a terminal block having a plurality of inputs connected to said switches providing a barrier between said switches and said controller;
   c. a plurality of optically coupled interface units connected to said terminal block for providing spark free intercoupling to said controller;
   d. a 100 OHM film resistor connected in series with each of said optically coupled interface units for providing safe current levels thereto;
   e. a power source connected to said current limiting means for providing power to said controller and said 100 OHM resistor; and
   f. solid state relay latching means and non-inductive logic control/alternator circuitry connected to said interface units, providing selective sequencing of said pumps by automatic or manual operation.

13. The apparatus of claim 12 wherein said optically coupled interface units comprise phototransistors utilizing a light emitting diode.

14. The apparatus of claim 12, further comprising solid state non-inductive output circuitry connected to said control/alternator cuitry for controlling pump starters for said pumps.

15. The apparatus of claim 14 wherein said output circuitry further comprises circuitry for activating a latched alarm system.

16. The apparatus of claim 12 wherein said logic control circuitry is comprised of Series 54TTL circuitry.

* * * * *